May 30, 1961 W. J. HABGOOD 2,985,991
APPARATUS FOR TAPING OBJECTS ON OBJECT HOLDERS
Filed May 22, 1959 8 Sheets-Sheet 1
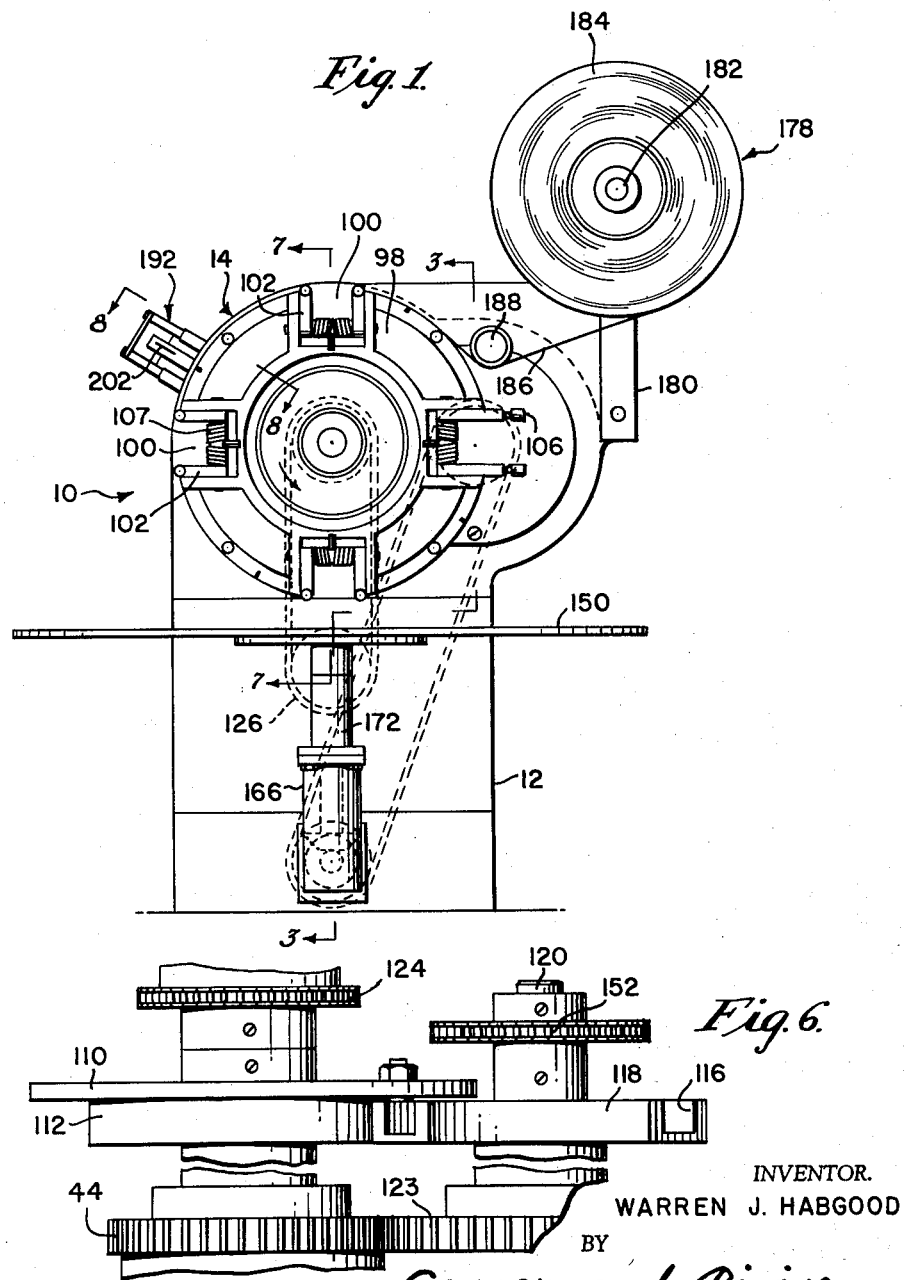
INVENTOR.
WARREN J. HABGOOD
BY
Caesar and Rivise
ATTORNEYS.

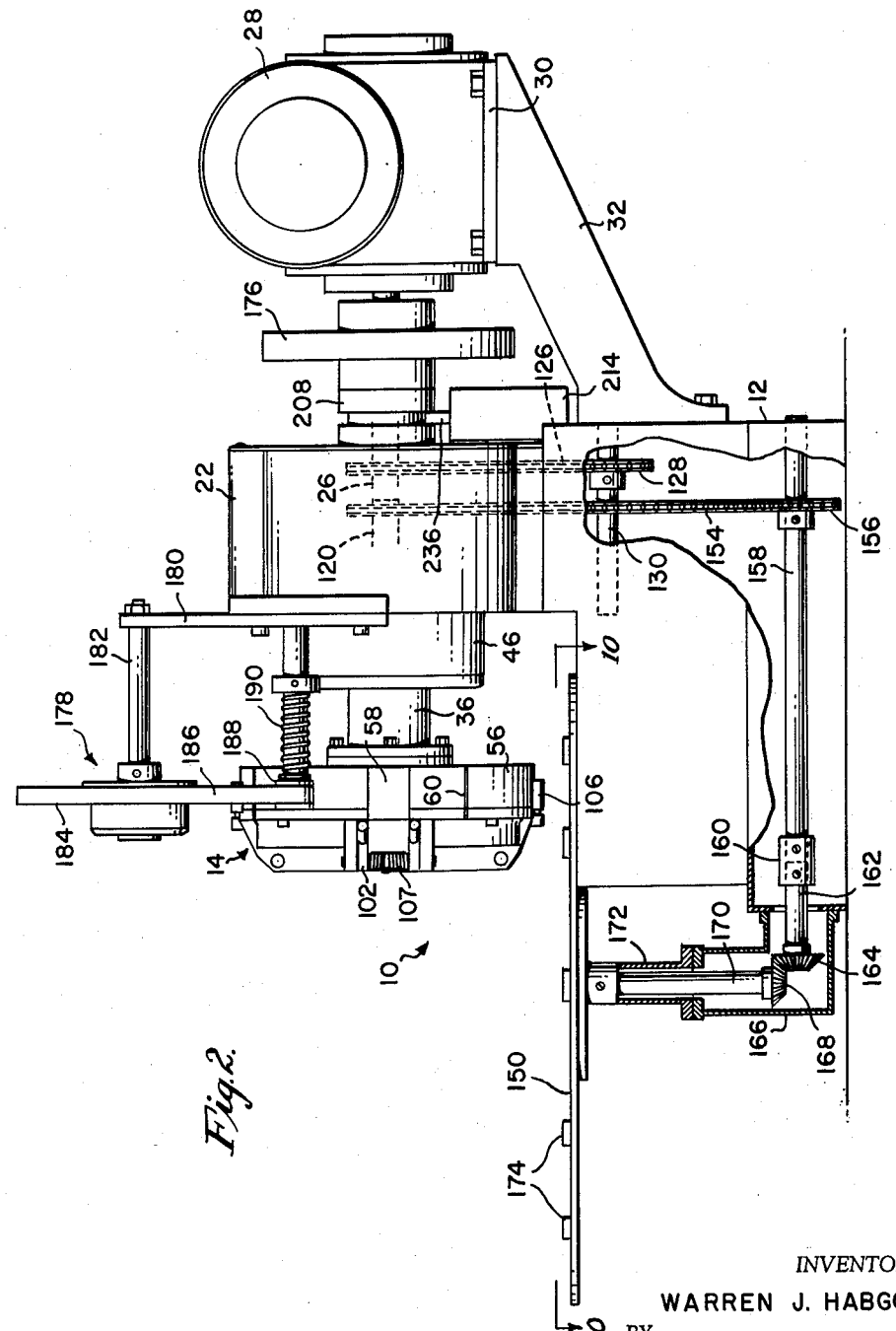

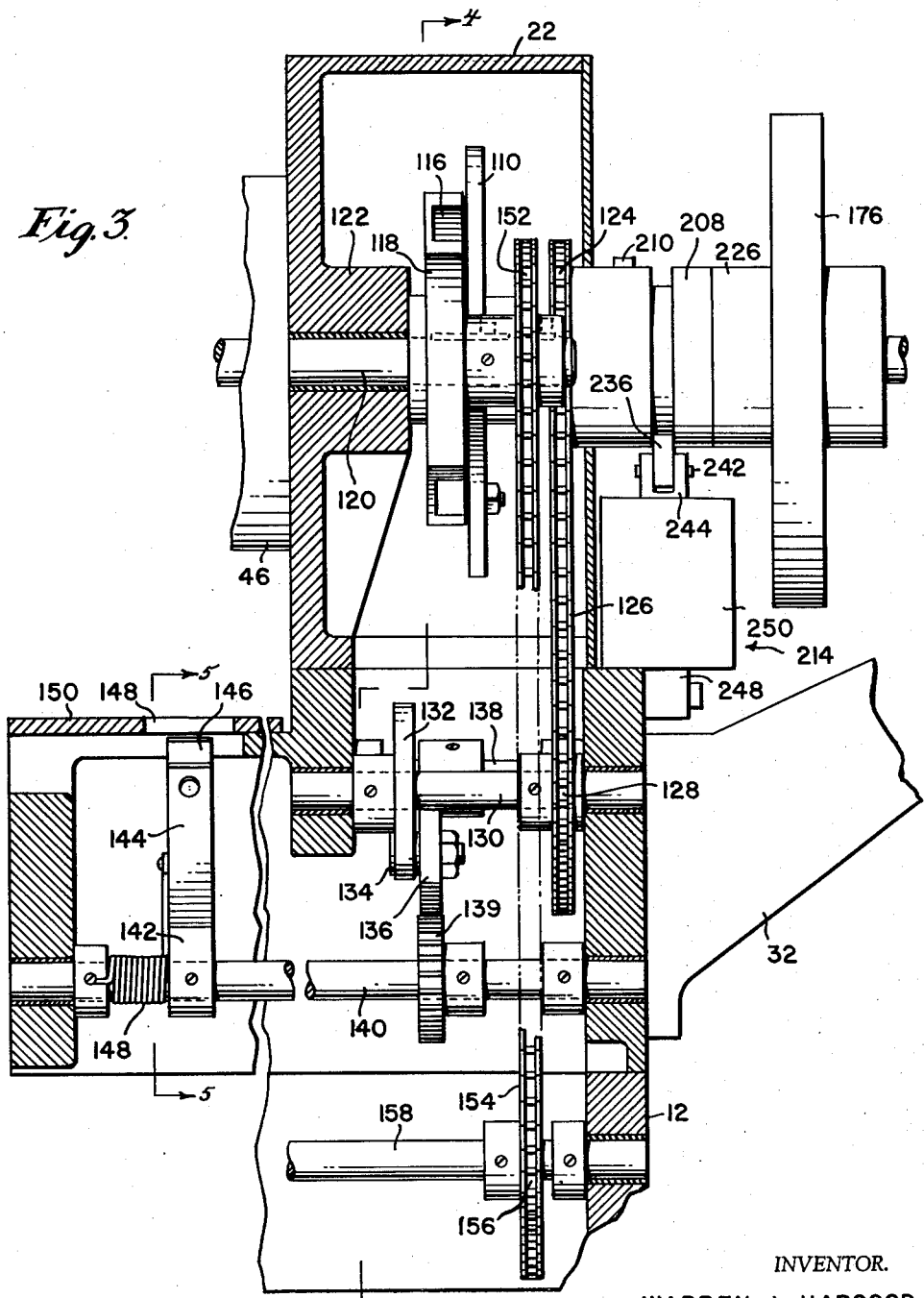

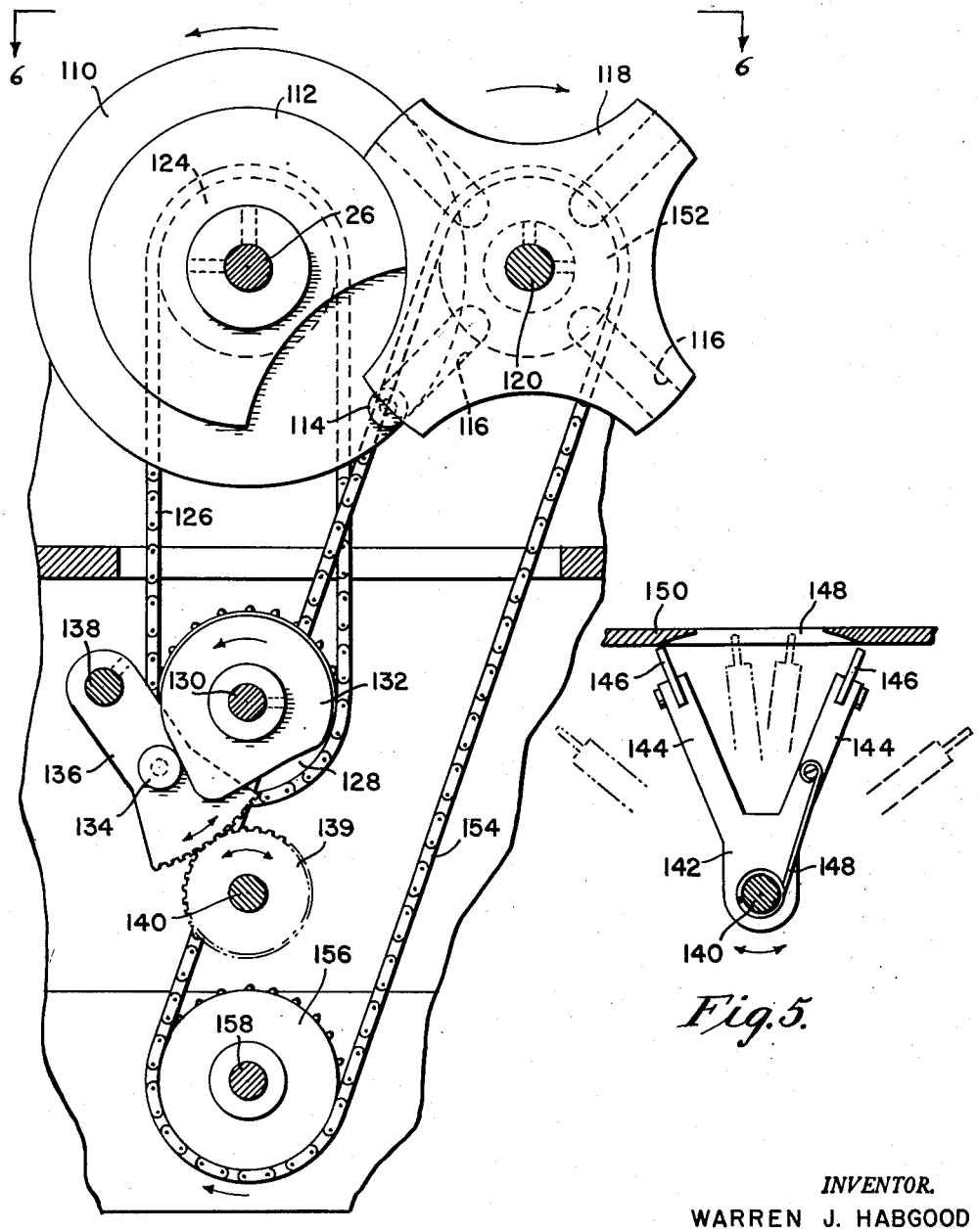

May 30, 1961 W. J. HABGOOD 2,985,991
APPARATUS FOR TAPING OBJECTS ON OBJECT HOLDERS
Filed May 22, 1959 8 Sheets-Sheet 5

INVENTOR.
WARREN J. HABGOOD
BY
Caesar and Rivise
ATTORNEYS.

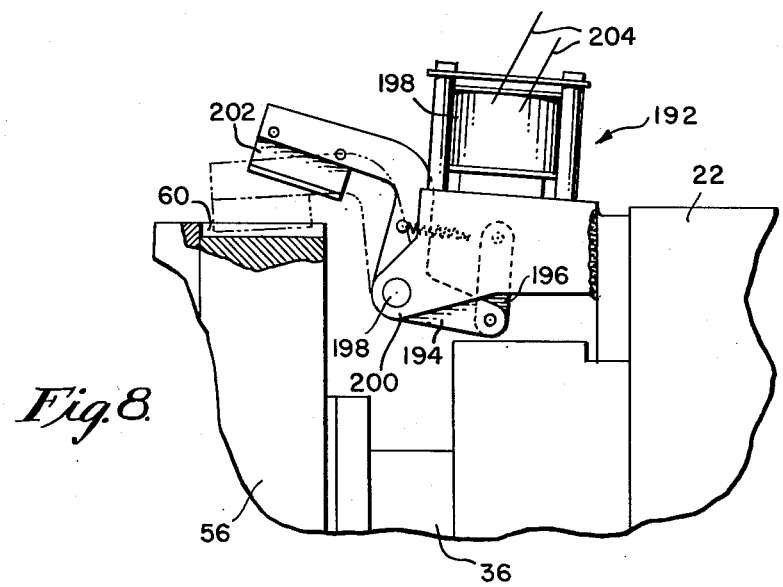
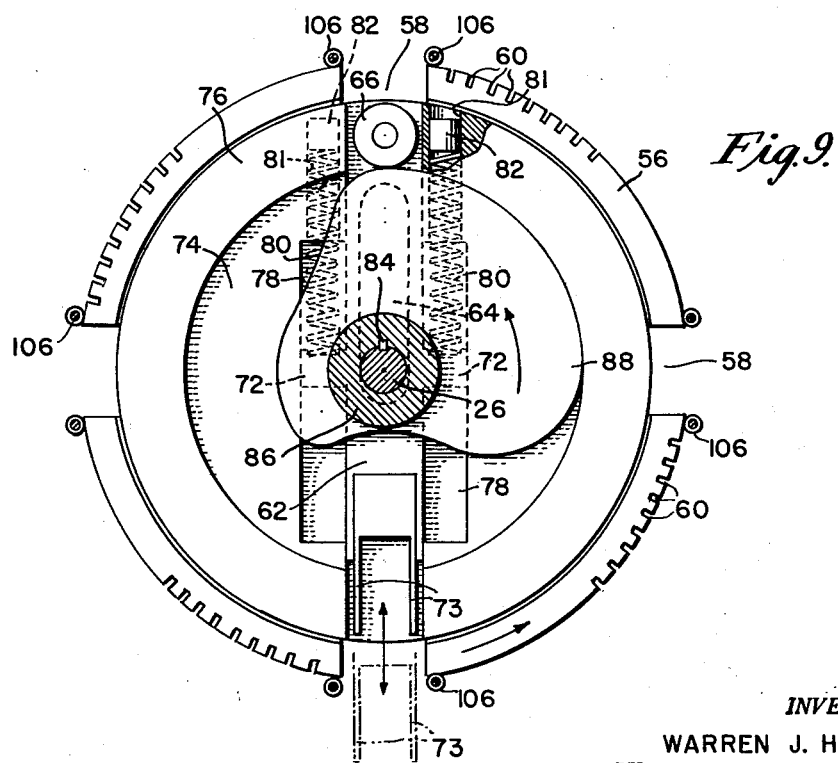

May 30, 1961 W. J. HABGOOD 2,985,991
APPARATUS FOR TAPING OBJECTS ON OBJECT HOLDERS
Filed May 22, 1959 8 Sheets-Sheet 7
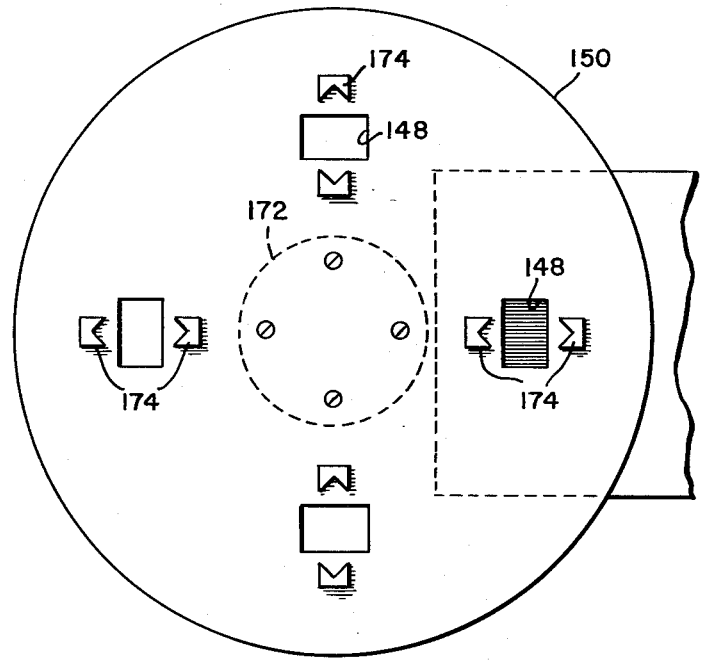
Fig. 10.
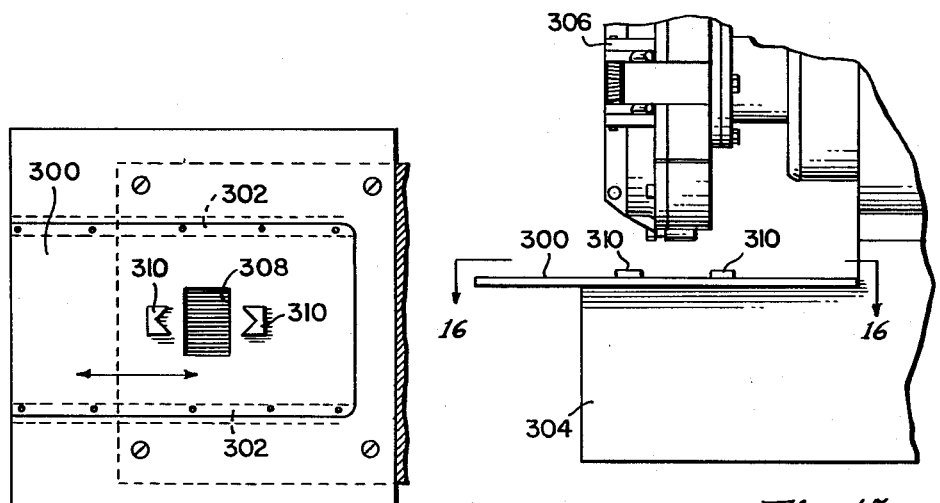
Fig. 16.
Fig. 15.
INVENTOR.
WARREN J. HABGOOD
BY
Caesar and Rivise
ATTORNEYS.

May 30, 1961    W. J. HABGOOD    2,985,991
APPARATUS FOR TAPING OBJECTS ON OBJECT HOLDERS
Filed May 22, 1959    8 Sheets-Sheet 8

INVENTOR.
WARREN J. HABGOOD
BY
Caesar and Rivise
ATTORNEYS.

United States Patent Office 2,985,991
Patented May 30, 1961

2,985,991

APPARATUS FOR TAPING OBJECTS ON OBJECT HOLDERS

Warren J. Habgood, 37 Millbourne Ave., Millbourne, Pa.

Filed May 22, 1959, Ser. No. 815,055

11 Claims. (Cl. 53—198)

This invention relates to a wrapping machine, and it particularly relates to a wrapping machine for wrapping adhesive or pressure sensitive tape or other wrapping material around an object for the purpose of attaching such object to another object such as a holder card or the like.

This application is a continuation-in-part of applicant's co-pending patent application Serial No. 704,787 filed December 23, 1957 and issued as Patent No. 2,922,265 on January 26, 1960.

Up to comparatively recently, the wrapping of tape around an object to fasten the object to a card or the like was primarily a hand operation. Some few attempts were made to accomplish this result automatically by means of a machine but such machines had so many disadvantages that they were never really commercially feasible. The problem was finally solved by applicant with the machine embodied in the aforesaid co-pending patent application. However, although the latter machine adequately accomplished its purposes, it was rather large and complex and, therefore, adapted primarily only for large scale operations.

It is one object of the present invention to provide a machine which can adequately perform the wrapping functions of applicant's prior machine but which has much less bulk and weight and consequently is better adapted to small scale operations.

Another object of the present invention is to provide a machine of the aforesaid type which is relatively simple, yet sturdy in construction, and which is adapted to be easily used with a minimum of skill.

Other objects and many of the attendant advantages of this invention will be readily appreciated as the same becomes better understood by reference to the following detailed description when considered in connection with the accompanying drawings wherein:

Fig. 1 is a front elevational view of a machine embodying the present invention.

Fig. 2 is a side elevational view, partly broken away, of the machine of Fig. 1.

Fig. 3 is a sectional view taken on line 3—3 of Fig. 1.

Fig. 4 is a sectional view taken on line 4—4 of Fig. 3.

Fig. 5 is a sectional view taken on line 5—5 of Fig. 3.

Fig. 6 is a plan view taken on line 6—6 of Fig. 4.

Fig. 7 is a sectional view taken on line 7—7 of Fig. 1.

Fig. 8 is a sectional view taken on line 8—8 of Fig. 1.

Fig. 9 is a sectional view taken on line 9—9 of Fig. 7.

Fig. 10 is a plan view taken on line 10—10 of Fig. 2.

Fig. 15 is a fragmentary, side elevational view of a modified embodiment of the invention.

Fig. 16 is a sectional view taken on line 16—16 of Fig. 15.

Figure 11:
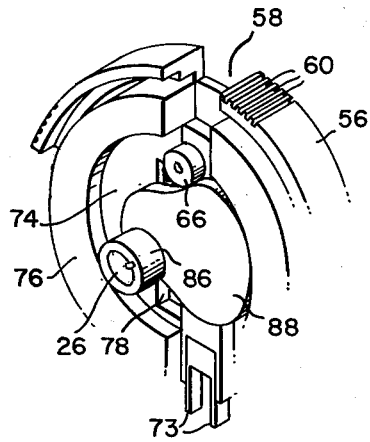
Fig. 11 is a fragmentary front perspective view of the taping dial.
Figure 12:
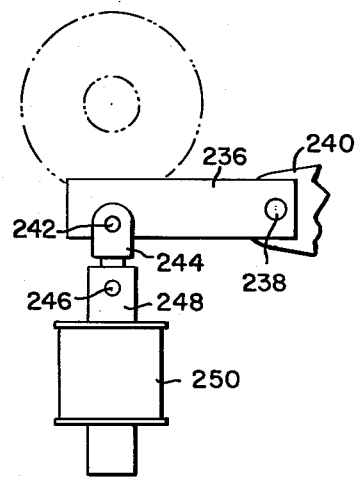
Fig. 12 is a detailed view of the clutch mechanism taken on line 12—12 of Fig. 7.
Figure 13:
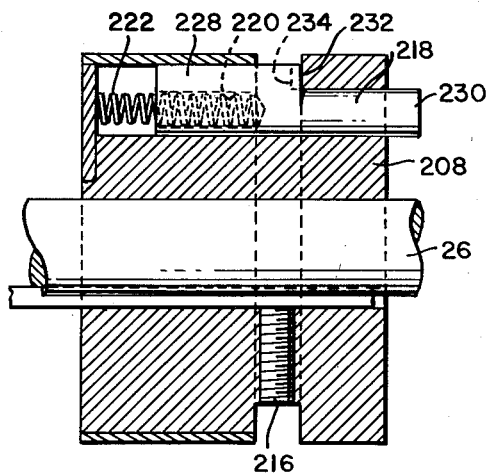
Fig. 13 is a detailed sectional view of the clutch sleeve and its associated parts.
Figure 14:
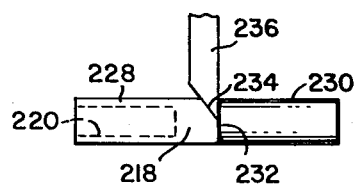
Fig. 14 is an elevational view of the clutch pin.

Referring now in greater detail to the various figures of the drawings wherein similar reference characters refer to similar parts, there is shown a taping machine, generally designated 10, comprising a base 12 upon which is mounted a taping dial head generally designated 14.

The dial head 14 comprises a circular plate 16 integral with a sleeve 18 fixed to an internally projecting boss 20 of a housing 22 by means of a set-screw 24. The housing 22 is mounted on the base 12.

Extending through the sleeve 18 is a rotatable shaft 26 connected at its rear end to the drive shaft of an electric motor 28; the motor 28 being mounted on a platform 30 supported by an inclined bracket 32 connected to the base 12. The shaft 26 is spaced from the inner wall of sleeve 18 by sleeve bearings 34.

Encircling the sleeve 18, coaxial with shaft 26, is a hollow, rotatable hub 36 having a flange at each end, as at 38 and 40. The flange 38 is connected by screws, bolts or the like, indicated at 42, to a gear 44. The portion of the hub 36 which includes flange 38 and gear 44 is enclosed within a gear housing 46; this gear housing being connected to housing 22 by screws, bolts or the like indicated at 48. Sleeve bearings 50 space the hub 36 from the sleeve 18.

At the opposite end of hub 36, the flange 40 is connected to a centrally apertured rotatable back plate or ring 52 by means of screws, bolts or the like indicated at 54. The back plate 52 is positioned adjacent the rear face of plate 16 and is provided with a forwardly extending lateral flange 56 positioned outwardly of the circumferential edge of the plate 16.

The flange 56 is provided with a plurality of equidistantly spaced radial slots 58 here shown as four in number. These slots divide the flange into four segments (as best seen in Fig. 9). Adjacent each slot 58 (at the right as viewed in Fig. 9) there is provided at least one notch 60. However, a series of notches 60 is shown in the machine illustrated.

Forwardly of the plate 16 there is provided a plunger 62 having a longitudinal slot 64 therein to slidably receive the shaft 26.

At its upper end, the plunger is provided with a roller 66 mounted on a spindle 68 which is held in place by a set screw 70; while intermediate its ends, the plunger is provided with oppositely extending cross-arms 72. At its lower end, the plunger is provided with a pair of resilient fingers 73 adapted to press the tape around the object.

The plunger is slidable within a vertical slot formed in a forward planular extension 74 of plate 16. This extension 74 (shown in Fig. 9) has a width corresponding to the width of plunger 62 as shown in Fig. 7, and is defined at its outer periphery by a forwardly extending flange 76 (shown in Fig. 9) which extends forwardly for a width corresponding to that of roller 66 shown in Fig. 7. Both the planular extension 74 and the flange 76 are correspondingly slotted to define the vertical slot containing the plunger 62 and to mate with opposite slots 58.

The planular extension 74 is also provided with lateral slot extensions 78 at either side of the guide slot for the plunger. The cross-arms 72 ride in these slot extensions and each arm 72 bears against the lower end of a coil spring 80, the upper end of which extends into a hole 81 having its upper end closed by a plug 82. The upper end of the spring bears against the plug 82 whereby the plunger is constantly and resiliently urged downwardly.

Keyed to the front end of the shaft 26, as by key 84, is a hub 86 integral with a cam 88. This cam 88 is rotatable within the space defined at its rear by planular extension 74 and at its periphery by the radially inner surface of flange 76. This cam is engaged by roller 66 which is held against the cam by the tension of springs 80. The cam itself has a high area, a low area and an intermediate area and the plunger is either raised, lowered or held in an intermediate position in accordance with the position of the cam.

The forward side of the space within which the cam 88 moves is defined by a cover or bearing plate 90 having a central hub 92 encompassing the hub 86 of the cam 88. A sleeve bearing 94 spaces the hub 88 from coaxial hub 92.

The cover plate 90 is bolted or otherwise secured to the flange 76 and is also provided on its outer face with a cam track 94 (similar to the corresponding part shown more clearly in applicant's aforesaid co-pending application). This cam track is provided with a high portion, a low portion and an intermediate portion and is arcuately slotted to receive attaching bolts 96 to permit circumferential adjustment of the cam track.

Attached at suitable positions to the flange 56 extending forwardly from the rotatable back plate 52, is a rotatable front plate 98. The plate 98 is provided with a plurality of recesses 100 in each of which is pivotally mounted a tape clamping assembly 102. This assembly 102 is more particularly disclosed in applicant's aforesaid co-pending application but includes at one end a pair of clamping fingers 104 provided with rollers 106. Torsion springs 107 bias each assembly 102 inwardly to the position shown in full line in Fig. 7.

At the opposite end, the assembly 102 is provided with a cam follower roller 108 adapted to ride over the cam track 94. When the roller 108 rides over a high spot on the cam track, it pivots the fingers 104 upwardly to release a strip of tape while when the fingers are down, they act to clamp the tape, as more particularly disclosed in applicant's co-pending application.

Within the housing 22 the shaft 26 is provided with a disc 110 integral with a hub portion 112. The disc 110 carries a roller 114 at one portion of its periphery. This roller 114 is arranged to coact with radial grooves 116 on a plate 118 to provide a Geneva motion. The plate 118 is mounted on a shaft 120 positioned in a boss 122 extending inwardly from housing 22.

Mounted on shaft 120 within the housing 46 is a gear 123 which meshes with gear 44 (as best seen in Fig. 6) to drivingly connect the hub 36 and the dial portions connected thereto to the Geneva drive mechanism, whereby these parts are given an indexing movement.

The shaft 26 is also provided, rearwardly of disc 110 within housing 22, with a sprocket 124. This sprocket is engaged with a chain 126 which is, in turn, engaged around a sprocket 128 mounted on a shaft 130. The shaft 130 also is provided with a cam 132 adapted to engage against a roller 134 extending laterally from the face of a segment gear 136 pivoted to a shaft 138 connected to the base 12. The teeth of gear 136 are engaged with a gear 139 mounted on a shaft 140 connected to the base.

Also mounted on shaft 140 is a wiper arm 142 having oppositely-inclined yoke portions 144 carrying flexible wiper elements 146. A torsion spring 148 biases the wiper arm to the position shown in full line in Fig. 5. By this construction, the wiper elements 146 are movable in an arcuate path beneath an opening 148 in a turntable 150 to be hereinafter more fully described.

Mounted on shaft 120 within housing 22 is a sprocket 152 connected through a drive chain 154 to a sprocket 156 mounted on a shaft 158 in the base. The shaft 158 is clutched at 160 to a shaft 162 provided with a bevel gear 164 positioned within a housing 166. The bevel gear 164 meshes with a bevel gear 168 at the lower end of a shaft 170. (See Fig. 2.) The upper end of shaft 170 extends through a tubular housing 172 and rotatably supports the turntable 150.

The turntable 150 is provided with four of the apertures or slots 148 circumferentially spaced from each other at angles of about 90 degrees. Each slot 148 is rectangular and is provided on opposite sides with retaining blocks or holders 174, each holder having a V-shaped notch facing the corresponding slot.

On the shaft 26, rearwardly of housing 22, there is provided a hand wheel 176. This wheel can be used to manually rotate the drive shaft 26 when it is disconnected from the motor 28. This wheel 176 can also be used as a flywheel.

In the operation of the machine so far described, the motor 28 is actuated to rotate shaft 26, which acts through the Geneva mechanism (shown in Fig. 4) to indexingly rotate the turntable 150 through chain 154, sprocket 156, shaft 158 and bevel gears 164 and 168 (shown in Fig. 2). It also acts through cam 128 to oscillate the segment gear 136 in predetermined timed intervals. This segment gear, in turn, acts through gear 139 and shaft 140 to oscillate the wiper arm 142 back and forth at timed intervals corresponding with the rotation of cam 128.

A tape feeding assembly 178 is mounted on the housing 22. This assembly comprises a supporting arm 180 having a shaft 182 at the upper end thereof. Rotatably mounted on shaft 182 is a roll of tape 184. The tape 186 coming from the roll 184 is passed beneath a pressure recoil roller 188 biased downwardly by a torsion spring 190. The tape 186, after passing under roller 188, is guided onto the periphery of the dial 14.

The torsion springs 107 urge the clamping fingers 104 and their rollers 106 inwardly against the flange 56. In this position, the cam follower rollers 108 engage the outer surface of the cam track 94 as the fingers rotate around the dial. When one of the cam rollers 108 engages the higher cam surface of the track, the assembly 102 is caused to pivot so that the rollers 106 on the fingers clear the tape 186. After clearing the tape, the fingers pivot back to a position where the cam roller 108 engages the intermediate cam surface of the cam track 94. At this position, the rollers 106 just touch but do not apply pressure to the tape, thereby acting to guide the tape.

As the cam roller 108 continues to move along the cam track, it engages the lower portion of the track. At this point, the rollers 106 positively grip the tape which spans the area therebetween. The clamping fingers then draw the tape along until it reaches a predetermined cut-off position where a knife mechanism, generally designated 192, cuts through the tape. The length of the cut-off portion of tape can be varied by varying the rotatable position of the cam track 94 by means of bolts 96.

The knife mechanism 192 comprises a cantilever 194 connected by a link 196 to a solenoid 198 adjustably mounted on the housing 22, and pivoted, at 198, to a bracket 200 extending from the solenoid housing. The cantilever carries a knife or razor blade 202 at its free end. This blade 202 is adapted to move down into one of the notches 60 after it has cut through the tape.

The solenoid 198 is energized through wires 204 which are in circuit with a micro-switch assembly 206 (see Fig. 7). This micro-switch assembly is arranged adjacent a clutch sleeve 208 mounted on shaft 26 and provided with a pin 210. As the sleeve 208 rotates with shaft 26, the pin 210 revolves and once during each revolution, it strikes the contact 212 of the micro-switch assembly to actuate the solenoid 198.

In order to stop and start the machine between operations, there is provided a one-revolution clutch assembly generally designated 214. This clutch assembly comprises the annularly grooved clutch sleeve 208, which is pinned to the shaft 26 by means of set-screw 216, and which is provided with a bore in which is positioned a lock pin 218.

The pin 218 is provided with a bore 220 into which extends a spring 222. The other end of the spring bears against the rear wall of the sleeve, so that the pin is urged rearwardly through the rear open end of the bore and into one of a plurality of recesses 224 in the front face of the hub 226.

The pin 218 is of stepped construction having a larger portion 228 in which the bore 220 is provided and a smaller portion 230 at the opposite end. Between these two portions is a shoulder 232 having a V-shaped notch 234 therein.

Operatively associated with the pin 218 is a detent 236 pivoted at 238 to a stud 240 connected to housing 22. The opposite end of detent 236 is pivotally connected at 242 to a link 244 which is pinned at 246 to the plunger 248 of a solenoid 250. The coil of the solenoid 250 is connected by wires 252 to a source of electrical energy through a switch means controlled by an operating means such as a foot pedal, hand lever or similar device.

Normally, when the solenoid 250 is deactivated, the detent 236 is in engagement within the V-shaped notch 234 to retain the pin 218 out of the corresponding recess 224. When the solenoid is actuated, however, it moves plunger 248 down to rock the detent 236 into a position where its edge slides free of the V-shaped notch 234, thereby permitting the spring 222 to move the pin 218 into the corresponding recess 224. In this manner, the wheel is clutched to the drive shaft. Upon deactivation of the solenoid, the plunger 248 moves up forcing the detent 236 into the V-shaped notch 234. Due to the shape of the detent 236, it has a camming effect resulting in the disengagement of the pin 218 with its corresponding recess 224. Although not shown, the detent or lever 236 is spring loaded upwardly.

In the operation of the machine, the objects to be taped and the holders therefor are placed in mating position at each holding area on the turntable 150. As shown, there are four such holding areas (although the number can be varied as desired). Each holding area comprises a slot 148 and its corresponding holder blocks 174.

The tape is fed from the tape feeding assembly 178 in the manner described above while the rollers 106 of clamping fingers 104 lightly engage the tape until the follower rollers 108 engage the low portion of cam track 94. At this point the rollers 106 grip the tape and draw it along until it reaches the cut-off station where the knife or blade 202 severs the tape in the manner described above. The cut-off portion of the tape is then carried around by the clamping fingers until it reaches the wrapping station.

With the objects and object holders, such as cards or the like, in position whereby they span a slot 148 and are engaged at opposite ends between blocks 174, the turntable is indexed in step-by-step rotation by means of the Geneva mechanism, and its associated parts, as previously described, so that each holder area of the turntable comes into mating position with a corresponding clamping assembly 102 simultaneously. At each such position, a cut-off strip of tape overlies the object and object holder to be wrapped.

When the tape has engaged the top of the object, the roller 66 is in a position wherein it engages the low area of the cam 88. As a result, the plunger 62 drops under the pressure of springs 80 and the resilient fingers 73 pass through the slot 148 and wipe the tape around the sides of the objects; at the same time, removing the tape from the clamping fingers. The plunger fingers, at this time, extend below the bottom of the object and its holder, but upon the roller 66 being engaged and lifted by the intermediate portion of the cam 88, the plunger fingers are partially raised to the level of the bottom of the object holder. It then dwells at this position until the tape ends are overlapped by means of the oscillating wiper arm 142. The wiper arm oscillates in one direction to wipe one tape end and then oscillates in the other direction to wipe the other tape end. The oscillation of the wiper arm 142 is, of course, timed with the arrival of the objects to be wrapped at the wrapping station and the movement of the plunger 62 by appropriate contouring of the cam 128.

After the object has been taped to its holder to form a complete, wrapped package, the package is moved to a removal position by the indexed movement of the turntable.

In order to give the operator sufficient time to remove the wrapped packages and replace them with new objects to be wrapped, the operator utilizes the one-revolution clutch to stop and start the machine after each revolution. This may be accomplished by a foot pedal, hand lever or any other desired means as described above. However, a well trained and experienced operator may hold the clutch in released position so that the machine continuously operates through its intermittent cycles; the operator being fast enough to remove and replace the objects on the turntable during the dwells occasioned by the indexing movements.

In Figs. 15 and 16, there is shown a modified form of the invention wherein all parts of the machine are the same as described above except that instead of a turntable type workholder, there is provided a slide 300, the edges of which are movable in channels 302 at opposite edges of the base 304. This slide 300 is movable in and out from under the dial head 306 and is provided with a slot 308 similar to slots 148 and with holder blocks 310 similar to blocks 174. This is a single feed type machine.

Obviously many modifications and variations of the present invention are possible in the light of the above teachings. It is, therefore, to be understood that within the scope of the appended claims, the invention may be practiced otherwise than as specifically described.

What is claimed as the invention is:

1. A machine for taping objects together comprising a tape applying dial mounted for intermittent, indexed rotation on a support, tape feeding means operatively connected to said tape applying dial for feeding tape to said dial, tape clamping means pivotally connected to said dial and pivotally movable into and out of clamping position for releasably retaining predetermined lengths of tape on said dial, means biasing said clamping means into said clamping position, clamp actuating means for moving said clamping means out of said clamping position, cut-off means operatively associated with said dial for cutting off predetermined lengths of tape held on said dial, a wrapping means operatively connected to said dial and radially movable relative thereto toward and from a wrapping station adjacent one portion of the periphery of said dial, said wrapping means being constructed and arranged to remove said lengths of tape from said dial and overlap said lengths around an object to be wrapped when said wrapping means moves toward said wrapping station, and drive means for simultaneously moving said dial, tape feeding means, clamp actuating means and wrapping means in predetermined timed relationship, said drive means comprising a motor, a shaft, selectively operable clutch means for releasably connecting said shaft to said motor, and an indexing means coaxially mounted on said shaft and operatively connected to each of said dial, tape feeding means, clamp actuating means and wrapping means for imparting simultaneous indexing movement thereto.

2. The machine of claim 1 wherein said indexing means is a disc mounted on said shaft and having a roller at one portion of the peripheral area thereof, said disc forming part of a Geneva drive.

3. The machine of claim 1 wherein said wrapping station is adjacent a turntable rotatably positioned in a plane perpendicular to the plane of said dial, said turntable having work-holding areas thereon and being operatively connected to said indexing means.

4. The machine of claim 1 wherein said wrapping station is adjacent a slidable work-holding means, said work-holding means being positioned on a support for slidable movement in a plane substantially tangent to the peripheral plane of said dial.

5. The machine of claim 1 wherein said shaft is provided with a switch actuating means arranged to contact and actuate an electrical switch during each revolution of said shaft, said switch being electrically connected to a solenoid, and said solenoid being operatively connected to said cut-off means.

6. A machine for taping objects together comprising a support, a shaft mounted for rotation on said support, a fixed dial supporting head coaxial with and adjacent one end of said shaft, a rotatable hub coaxial with said shaft, a rotatable dial on said supporting head, means connecting said hub to said dial, indexing means operatively connected to said shaft, means operatively connecting said indexing means to said hub, drive means releasably connected to said shaft, tape feeding means operatively connected to said shaft and constructed and arranged to feed tape to said dial, releasable tape clamping means on said dial, cam means on said supporting head for opening and closing said clamping means as said dial rotates, tape cut-off means adjacent said dial, actuating means controlled by the rotation of said shaft and operatively connected to said cut-off means for moving it into and out of cutting position, and selectively-operable clutch means connected to said shaft for connecting and disconnecting said shaft from a drive means.

7. A machine for taping objects together comprising a support, a rotatable shaft on said suport, a tape applying dial on said shaft, a tape feeding means operatively connected to said tape applying dial for feeding tape to said dial, tape clamping means releasably retaining predetermined lengths of tape on said dial, cut-off means operatively associated with said dial for cutting off lengths of tape, and a wrapping means operatively connected to said dial and movable radially relative thereto, said shaft having an indexing means operatively connected thereto, means operatively connecting said indexing means to said dial, a clutch sleeve fixed on said shaft, an axially movable pin in an open-ended bore in said sleeve, spring means urging said pin out of said bore and into a corresponding recess in a drive hub on said shaft, a movable detent adjacent said sleeve, a cam notch in said pin adapted to receive said detent, said detent being constructed to cam said pin back from said recess against the force of said spring means when it engages said cam notch, and selectively operable means for moving said detent into and out of said cam notch.

8. The machine of claim 7 wherein said selectively operable means comprises a solenoid having a plunger linked to said detent.

9. The machine of claim 7 wherein a wheel is provided on said drive hub, said hub being connectable to a motor.

10. The machine of claim 7 wherein said sleeve is provided with a contact pin adapted to releasably engage a switch means adjacent said shaft during rotation of said shaft, said switch means being in electrical circuit with a control solenoid operatively connected to said cut-off means.

11. The machine of claim 7 wherein the indexing means comprises a disc mounted on said shaft, a roller at the peripheral portion of said disc, a second shaft mounted on said support parallel to said first shaft, a plate having a series of radial grooves to releasably receive said roller during rotation of said first shaft whereby said plate is intermittently rotated to intermittently rotate said second shaft, a work-holding turntable operatively connected to said second shaft for intermittent drive thereby, a cam operatively connected to said first shaft for continuous rotation thereby, said cam being operatively engaged with a pivotally mounted segment gear for oscillation thereof, said segment gear being in mesh with a gear operatively connected to a wiper arm, and said wiper arm being pivotally connected to said support below said turntable and in a position to oscillate adjacent the undersurface of said turntable.

References Cited in the file of this patent

UNITED STATES PATENTS 2,223,017     Abrams _____ Nov. 26, 1940